US008166770B2

(12) United States Patent
Suzuki et al.

(10) Patent No.: US 8,166,770 B2
(45) Date of Patent: May 1, 2012

(54) APPARATUS AND METHOD FOR COOLING ELECTRICAL EQUIPMENT

(75) Inventors: Yusuke Suzuki, Toyota (JP); Tetsuya Ishihara, Kariya (JP)

(73) Assignee: Toyota Jidosha Kabushiki Kaisha, Aichi-Ken (JP)

(*) Notice: Subject to any disclaimer, the term of this patent is extended or adjusted under 35 U.S.C. 154(b) by 594 days.

(21) Appl. No.: 12/440,699

(22) PCT Filed: Dec. 7, 2007

(86) PCT No.: PCT/JP2007/074076
§ 371 (c)(1),
(2), (4) Date: Mar. 10, 2009

(87) PCT Pub. No.: WO2008/072719
PCT Pub. Date: Jun. 19, 2008

(65) Prior Publication Data
US 2009/0249803 A1    Oct. 8, 2009

(30) Foreign Application Priority Data
Dec. 14, 2006    (JP) .................................. 2006-337075

(51) Int. Cl.
F25D 17/04     (2006.01)
F25D 23/12     (2006.01)
B60H 1/32      (2006.01)

(52) U.S. Cl. ............................. 62/186; 62/259.2; 62/244
(58) Field of Classification Search .................... 62/186, 62/259.2, 157, 244, 178, 180, 56
See application file for complete search history.

(56) References Cited

FOREIGN PATENT DOCUMENTS

| | | |
|---|---|---|
| JP | 59-207565 A | 11/1984 |
| JP | 62-1614 A | 1/1987 |
| JP | 2001-86601 A | 3/2001 |
| JP | 2001-130268 A | 5/2001 |
| JP | 2001-253306 A | 9/2001 |
| JP | 2001-313092 A | 11/2001 |
| JP | 2004-1674 A | 1/2004 |
| JP | 2004-116904 A | 4/2004 |
| JP | 2006-143183 A | 6/2006 |
| WO | 01/15922 A1 | 3/2001 |

*Primary Examiner* — Chen Wen Jiang
(74) *Attorney, Agent, or Firm* — Sughrue Mion, PLLC

(57) ABSTRACT

An HV_ECU executes a program, which includes a step of receiving route information; a step of acquiring a duty command value of a battery cooling blower; a step of calculating a cooling airflow; steps for acquiring a battery temperature and an intake temperature; a step of calculating a value TB−TC; a step of calculating a cooling performance; a step of estimating a battery temperature; and a step of performing fail safe processing when in an abnormal state.

8 Claims, 12 Drawing Sheets

F I G. 7

| COOLING AIR FLOW RATE $Va (m^3/h)$ | | AIR FLOW RESISTANCE INFORMATION | | | | |
|---|---|---|---|---|---|---|
| | | 0 | 1 | 2 | 3 | 4 |
| BATTERY COOLING BLOWER COMMAND duty(%) | 0 | 0 | 0 | 10 | 15 | 20 |
| | 20 | 20 | 20 | 30 | 35 | 40 |
| | 30 | 30 | 30 | 40 | 45 | 50 |
| | 40 | 40 | 40 | 50 | 55 | 60 |
| | 50 | 50 | 50 | 60 | 65 | 70 |
| | 60 | 60 | 60 | 70 | 75 | 80 |
| | 100 | 70 | 70 | 80 | 85 | 90 |

F I G. 8

| COOLING AIR FLOW RATE Va(m³/h) | BATTERY COOLING BLOWER COMMAND duty(%) | AIR FLOW RESISTANCE INFORMATION | | | | | | | | | | |
|---|---|---|---|---|---|---|---|---|---|---|---|
| | | 0 | 1 | 2 | 3 | 4 | 5 | 6 | 7 | 8 | 9 | 10 |
| 0 | 0 | 0 | 0 | 10 | 15 | 20 | 25 | 30 | 35 | 40 | 45 | 50 |
| | 20 | 20 | 20 | 30 | 35 | 40 | 45 | 50 | 55 | 60 | 65 | 70 |
| | 30 | 30 | 30 | 40 | 45 | 50 | 55 | 60 | 65 | 70 | 75 | 80 |
| | 40 | 40 | 40 | 50 | 55 | 60 | 65 | 70 | 75 | 80 | 85 | 90 |
| | 50 | 50 | 50 | 60 | 65 | 70 | 75 | 80 | 85 | 90 | 95 | 100 |
| | 60 | 60 | 60 | 70 | 75 | 80 | 85 | 90 | 95 | 100 | 105 | 110 |
| | 100 | 70 | 70 | 80 | 85 | 90 | 95 | 100 | 105 | 110 | 115 | 120 |

F I G. 9

| COOLING PERFORMANCE W (W) | | DIFFERENCE BETWEEN BATTERY TEMPERATURE AND INTAKE AIR TEMPERATURE Tb−Tc (°C) | | | | |
|---|---|---|---|---|---|---|
| | | -10 | -5 | 0 | 5 | 10 |
| COOLING AIR FLOW RATE Va (m³/h) | 0 | -15 | -10 | 0 | 10 | 15 |
| | 10 | -60 | -40 | 0 | 40 | 60 |
| | 20 | -90 | -60 | 0 | 60 | 90 |
| | 40 | -135 | -90 | 0 | 90 | 135 |
| | 80 | -180 | -120 | 0 | 120 | 180 |
| | 120 | -240 | -160 | 0 | 160 | 240 |
| | 160 | -270 | -180 | 0 | 180 | 270 |

FIG. 11

FOR ROUTE A

| COOLING AIR FLOW RATE Va (m³/h) | | AIR CONDITIONER BLOWER COMMAND duty(%) | | | | |
|---|---|---|---|---|---|---|
| | | 0 | 20 | 40 | 60 | 80 |
| BATTERY COOLING BLOWER COMMAND duty(%) | 0 | 0 | 0 | 10 | 15 | 20 |
| | 20 | 20 | 20 | 30 | 35 | 40 |
| | 30 | 30 | 30 | 40 | 45 | 50 |
| | 40 | 40 | 40 | 50 | 55 | 60 |
| | 50 | 50 | 50 | 60 | 65 | 70 |
| | 60 | 60 | 60 | 70 | 75 | 80 |
| | 100 | 70 | 70 | 80 | 85 | 90 |

FIG. 12

FOR ROUTE B

| COOLING AIR FLOW RATE Va (m³/h) | | AIR CONDITIONER BLOWER COMMAND duty(%) | | | | |
|---|---|---|---|---|---|---|
| | | 0 | 20 | 40 | 60 | 80 |
| BATTERY COOLING BLOWER COMMAND duty(%) | 0 | 5 | 5 | 15 | 20 | 25 |
| | 20 | 25 | 25 | 35 | 40 | 45 |
| | 30 | 35 | 35 | 45 | 50 | 55 |
| | 40 | 45 | 45 | 55 | 60 | 65 |
| | 50 | 55 | 55 | 65 | 70 | 75 |
| | 60 | 65 | 65 | 75 | 80 | 85 |
| | 100 | 75 | 75 | 85 | 90 | 95 |

FIG. 13

FOR ROUTE C

| COOLING AIR FLOW RATE Va(m³/h) | | AIR CONDITIONER BLOWER COMMAND duty(%) | | | | |
|---|---|---|---|---|---|---|
| | | 0 | 20 | 40 | 60 | 80 |
| BATTERY COOLING BLOWER COMMAND duty(%) | 0 | 10 | 10 | 20 | 25 | 30 |
| | 20 | 30 | 30 | 40 | 45 | 50 |
| | 30 | 40 | 40 | 50 | 55 | 60 |
| | 40 | 50 | 50 | 60 | 65 | 70 |
| | 50 | 60 | 60 | 70 | 75 | 80 |
| | 60 | 70 | 70 | 80 | 85 | 90 |
| | 100 | 80 | 80 | 90 | 95 | 100 |

FIG. 14

FOR ROUTE D

| COOLING AIR FLOW RATE Va(m³/h) | | AIR CONDITIONER BLOWER COMMAND duty(%) | | | | |
|---|---|---|---|---|---|---|
| | | 0 | 20 | 40 | 60 | 80 |
| BATTERY COOLING BLOWER COMMAND duty(%) | 0 | 15 | 15 | 25 | 30 | 35 |
| | 20 | 35 | 35 | 45 | 50 | 55 |
| | 30 | 45 | 45 | 55 | 60 | 65 |
| | 40 | 55 | 55 | 65 | 70 | 75 |
| | 50 | 65 | 65 | 75 | 80 | 85 |
| | 60 | 75 | 75 | 85 | 90 | 95 |
| | 100 | 85 | 85 | 95 | 100 | 105 |

APPARATUS AND METHOD FOR COOLING ELECTRICAL EQUIPMENT

TECHNICAL FIELD

The present invention relates to cooling of electrical equipment and, more specifically, to a technique of estimating, with high accuracy, state of supply of cooling medium to electrical equipment connected to a medium passage having a plurality of routes.

BACKGROUND ART

Electric vehicles having a motor for running mounted in place of an engine (including vehicles having the motor for running operated by a fuel cell) have been developed and put to practical use. Further, hybrid vehicles having a motor for running mounted in addition to an engine have also been developed and put to practical use. Such a vehicle is provided with a battery for running that outputs driving electric power to the motor for running. The battery for running involves a chemical reaction at the time of charging/discharging and, therefore, it must be cooled to prevent battery degradation caused when the battery attains to a high temperature.

In view of such a problem, Japanese Patent Laying-Open No. 2004-1674 discloses a battery temperature control device that reliably cools an in-vehicle battery. The battery temperature control device is applied to a vehicle having a rear air conditioner unit, which is installed at a rear part of the vehicle and contains air temperature adjusting means for adjusting temperature of the air blown out to the vehicle compartment, and the device controls the temperature of in-vehicle battery. The battery temperature control device has a duct leading the air that has passed through the air temperature adjusting means to the battery, and the air led by the duct is supplied to the battery, whereby the battery temperature is controlled.

According to the laid-open application, by the battery temperature control device, it is possible, when cooling the battery, to lower the air temperature blown to the battery than in the conventional example in which air in the vehicle compartment is blown to the battery.

In the battery temperature control device disclosed in the laid-open application, however, a plurality of routes are formed, including a route for the air in the compartment circulating to the battery and a route for cooling the battery using the air cooled by the air conditioner. As a result, it becomes impossible to accurately grasp the cooling performance of the cooling fan only from information related to the state of operation of the cooling fan (such as a duty command value or fan rotation speed). The reason for this is that pressure loss differs route by route, and that if a plurality of cooling fans are provided on distribution routes of a cooling medium, battery cooling performance varies even when the cooling fans operate in a similar manner. This possibly leads to lower accuracy of cooling control of the battery, or to a delay in determining an abnormality condition such as an excessive charging of the battery.

DISCLOSURE OF THE INVENTION

An object of the present invention is to provide cooling apparatus and cooling method for electrical equipment that can correctly grasp the cooling performance and thereby improve accuracy of cooling control of the electrical equipment and accuracy of determining any abnormality.

According to an aspect, the present invention provides an electrical equipment cooling apparatus for cooling electrical equipment. The cooling apparatus includes a medium passage having one end connected to an inlet and the other end connected to the electrical equipment, and having a plurality of cooling medium distribution routes between the inlet and the electrical equipment; supply means for supplying the cooling medium through the medium passage to the electrical equipment; selecting means for selecting any one of the plurality of routes; estimating means for estimating degree of cooling of the electrical equipment by the cooling medium supplied by the supply means, based on information related to a degree of pressure loss corresponding to the route selected by the selecting means; and control means for controlling at least one of the supply means and the electrical equipment in accordance with the estimated degree of cooling.

According to the present invention, when a plurality of distribution routes are formed in the medium passage, each distribution route has different pressure loss. Therefore, by estimating degree of cooling based on the piece of information related to the degree of pressure loss corresponding to the selected route, it becomes possible to correctly grasp the cooling performance of the supply means for the electrical equipment. Therefore, by regulating the amount of supply in accordance with the estimated degree of cooling, for example, accuracy of cooling control of the electrical equipment can be improved. Alternatively, by estimating the temperature of the electrical equipment based on the estimated degree of cooling and determining at least either one of the supply means and the electrical equipment to be abnormal based on a difference between the estimated temperature and the actual temperature of the electrical equipment, accuracy of determining abnormality can be improved. Therefore, cooling apparatus and cooling method for electrical equipment that can correctly grasp the cooling performance and thereby improve accuracy of cooling control of the electrical equipment and accuracy of determining any abnormality can be provided.

Preferably, the cooling apparatus for electrical equipment further includes first temperature detecting means for detecting a first temperature of the electrical equipment; and second temperature detecting means for detecting a second temperature of the cooling medium supplied to the electrical equipment. The estimating means includes means for estimating flow rate of the cooling medium supplied to the electrical equipment by the supply means, and means for estimating the degree of cooling, based on the estimated flow rate and a difference between the detected first temperature and the detected second temperature.

According to the present invention, when a plurality of distribution routes are formed in the medium passage, each distribution route has different pressure loss. Therefore, it is possible to estimate flow rate of the cooling medium (for example, air) supplied to the electrical equipment, based on the information related to the degree of pressure loss corresponding to the selected route. Further, based on the estimated flow rate and the difference between the first and second temperatures, it is possible to estimate the degree of cooling of the electrical equipment by the cooling medium in the selected route. As a result, the cooling performance of the supply means for the electrical equipment can correctly be grasped.

More preferably, the cooling apparatus for electrical equipment further includes temperature estimating means for estimating temperature of the electrical equipment based on the estimated degree of cooling; and determining means for determining whether at least one of the electrical equipment and the supply means is in an abnormal condition, based on a difference between the detected first temperature and the estimated temperature. The control means includes means for controlling at least one of the supply means and the electrical equipment such that the temperature of the electrical equipment is at least not increased, when determination of the abnormal condition is made.

According to the present invention, the temperature of the electrical equipment is estimated based on the estimated degree of cooling, and if it is much different from the detected first temperature (for example, if the first temperature is significantly higher), it is possible to determine abnormality of the electrical equipment (for example, excessively charged state of the power storage mechanism), or abnormality such as degraded performance of the supply means, with high accuracy.

More preferably, the medium passage is provided, at a branching position of the distribution routes, with a switching mechanism for switching the distribution routes. The selecting means includes means for selecting the distribution route by switching the distribution route using the switching mechanism. The information includes correspondence between state of switching of the switching mechanism and the flow rate.

According to the present invention, based on the information related to the switching state of the switching mechanism, the currently selected distribution route can be identified. By estimating the flow rate of cooling medium corresponding to the identified distribution route, it is possible to estimate the flow rate of the cooling medium supplied to the electrical equipment. As a result, it is possible to correctly grasp the cooling performance of the supply means for the electrical equipment.

According to another aspect, the present invention provides an electrical equipment cooling apparatus for cooling electrical equipment. The cooling apparatus includes: a medium passage for a cooling medium, having one end connected to an inlet and the other end connected to the electrical equipment, and having a distribution route between the inlet and the electrical equipment; first supply means for supplying the cooling medium through the medium passage to the electrical equipment; second supply means provided between the inlet and the first supply means on the distribution route, for supplying the cooling medium to the electrical equipment; estimating means for estimating degree of cooling of the electrical equipment by the cooling medium supplied by the first supply means, based on a state of supply of the cooling medium supplied by the second supply means; and control means for controlling at least one of the first supply means, the second supply means and the electrical equipment, in accordance with the estimated degree of cooling.

According to the present invention, when first and second supply means are provided on the distribution route, the flow rate of cooling medium supplied to the electrical equipment differs dependent on the state of supply of the cooling medium by the second supply means, even if the first supply means operates in the same manner. By estimating the degree of cooling of the electrical equipment by the cooling medium supplied by the first supply means based on the state of supply of the cooling medium by the second supply means, the cooling performance of the first supply means for the electrical equipment can correctly be grasped. Consequently, by regulating the amount of supply in accordance with the estimated degree of cooling, for example, it is possible to improve accuracy of cooling control of the electrical equipment. Alternatively, by estimating the temperature of the electrical equipment based on the estimated degree of cooling and determining at least one of the first supply means, the second supply means and the electrical equipment to be abnormal based on a difference between the estimated temperature and the actual temperature of the electrical equipment, accuracy of determining abnormality can be improved. Therefore, cooling apparatus and cooling method for electrical equipment that can correctly grasp the cooling performance and thereby improve accuracy of cooling control of the electrical equipment and accuracy of determining any abnormality can be provided.

Preferably, the cooling apparatus for electrical equipment further includes first temperature detecting means for detecting a first temperature of the electrical equipment; and second temperature detecting means for detecting a second temperature of the cooling medium supplied to the electrical equipment. The estimating means includes means for estimating flow rate of the cooling medium supplied to the electrical equipment by the first supply means, based on the state of supply of the second supply means, and means for estimating the degree of cooling, based on the estimated flow rate and a difference between the detected first temperature and the detected second temperature.

According to the present invention, when first and second supply means are provided on the distribution route, the flow rate of cooling medium supplied to the electrical equipment differs dependent on the state of supply of the cooling medium by the second supply means, even if the first supply means operates in the same manner. Therefore, it is possible to estimate the flow rate of the cooling medium supplied by the first supply means to the electrical equipment, based on the state of supply by the second supply means. Further, based on the estimated flow rate and the difference between the first and second temperatures, it is possible to estimate the degree of cooling. Consequently, it is possible to correctly grasp the cooling performance of the first supply means for the electrical equipment.

More preferably, the cooling apparatus for the electrical equipment further includes: temperature estimating means for estimating temperature of the electrical equipment based on the estimated degree of cooling; and determining means for determining whether at least one of the first supply means, the second supply means and the electrical equipment is in an abnormal condition, based on a difference between the detected first temperature and the estimated temperature. The control means includes means for controlling at least one of the first supply means, the second supply means and the electrical equipment such that the temperature of the electrical equipment is at least not increased, when determination of the abnormal condition is made.

According to the present invention, based on the estimated degree of cooling, the temperature of the electrical equipment is estimated, and if it is much different from the detected first temperature (for example, if the first temperature is significantly higher), it is possible to determine abnormality of the electrical equipment or abnormality such as degraded performance of the first and second supply means.

More preferably, the medium passage includes a plurality of distribution routes. The medium passage is provided, at a branching position of the distribution routes, with a switching mechanism for switching the distribution routes. The cooling apparatus further includes selecting means for selecting any one of the plurality of distribution routes, by switching the distribution route using the switching mechanism. The estimating means includes means for estimating the degree of cooling based on the selected distribution route, in addition to the state of supply by the second supply means.

According to the present invention, when a plurality of distribution routes are formed in the medium passage, each distribution route has different pressure loss. Therefore, the flow rate of distributed cooling medium differs even when the first and second supply means operate in the similar manner. By estimating the degree of cooling based on the selected distribution route in addition to the state of supply of the second supply means, it is possible to correctly grasp the cooling performance of the first supply means for the electrical equipment, in the selected distribution route.

More preferably, the second supply means includes means for supplying the cooling medium to the medium passage by rotation of a fan. The cooling apparatus further includes detecting means for detecting rotation speed of the fan. The estimating means includes means for estimating the degree of cooling based on the detected rotation speed and the selected distribution route.

According to the present invention, by detecting the rotation speed of the fan, it is possible to detect the state of supply of the second supply means. Therefore, by estimating the degree of cooling based on the selected distribution route and the rotation speed of the fan, it is possible to correctly grasp the cooling performance of the first supply means for the electrical equipment.

More preferably, the second supply means includes means for supplying the cooling medium to the medium passage by rotation of a fan, using an electric motor as a power source. The estimating means includes means for estimating the degree of cooling based on a duty command value at the time of control of the electric motor and on the selected distribution route.

According to the present invention, based on the duty command at the time of controlling the electric motor, it is possible to detect the state of supply of the second supply means. Therefore, by estimating the degree of cooling based on the selected distribution route and the duty command, it is possible to correctly grasp the cooling performance of the first supply means for the electrical equipment.

BRIEF DESCRIPTION OF THE DRAWINGS

FIG. 7 is a (first) table representing cooling air flow rate Va in correspondence with duty command value of a battery cooling blower and air flow resistance information.

FIG. 8 is a (second) table representing cooling air flow rate Va in correspondence with duty command value of a battery cooling blower and air flow resistance information.

FIG. 9 shows cooling performance Wc in correspondence with cooling air flow rate Va and difference between battery temperature and intake temperature.

FIG. 11 shows cooling performance Wc corresponding to route A in correspondence with the duty command value of a rear air conditioner blower and the duty command value of a battery cooling blower.

FIG. 12 shows cooling performance Wc corresponding to route B in correspondence with the duty command value of the rear air conditioner blower and the duty command value of the battery cooling blower.

FIG. 13 shows cooling performance Wc corresponding to route C in correspondence with the duty command value of the rear air conditioner blower and the duty command value of the battery cooling blower.

FIG. 14 shows cooling performance Wc corresponding to route D in correspondence with the duty command value of the rear air conditioner blower and the duty command value of the battery cooling blower.

BEST MODES FOR CARRYING OUT THE INVENTION

Figure 1:
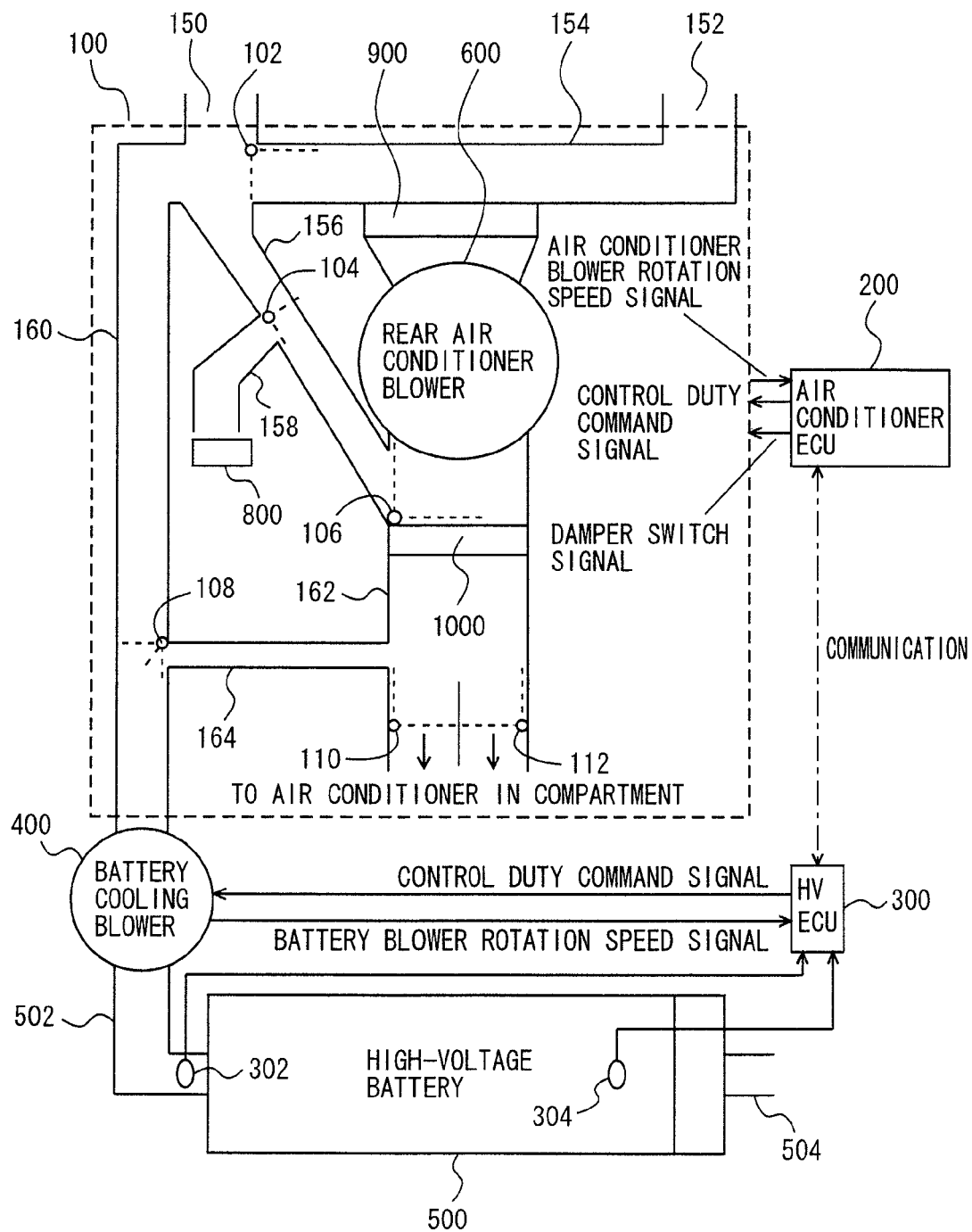
FIG. 1 shows a configuration of a cooling apparatus for electrical equipment in accordance with a first embodiment.

In the following, embodiments of the present invention will be described with reference to the figures. In the following description, the same components are denoted by the same reference characters. Their names and functions are also the same. Therefore, detailed description thereof will not be repeated.

First Embodiment

As shown in FIG. 1, the cooling apparatus for electrical equipment in accordance with the present embodiment includes a rear air conditioner unit 100, an air conditioner ECU (Electronic Control Unit) 200, an HV_ECU 300 and a battery cooling blower 400.

In the present embodiment, the "electrical equipment" is described as a high-voltage battery 500. The electrical equipment, however, is not specifically limited to the high-voltage battery and it may be a capacitor, a fuel cell, an inverter or other electrical equipment.

Further, in the present embodiment, high-voltage battery 500 is mounted on a hybrid vehicle having a rotating electric machine and an internal combustion engine as driving sources. High-voltage battery 500 supplies electric power to the rotating electric machine. The vehicle is not limited to a hybrid vehicle and, by way of example, it may be an electric vehicle or a fuel cell vehicle.

High-voltage battery 500 is mounted between a rear seat provided in the compartment and a trunk room provided on the rear side of the vehicle (both not shown). The position where high-voltage battery 500 is mounted is not limited to the above. Further, application of the present invention is not limited to electrical equipment mounted on a vehicle.

Rear air conditioner unit 100 is provided between the rear seat provided in the compartment and the trunk room provided on the rear side of the vehicle. In rear air conditioner unit 100, a medium passage is formed, through which a cooling medium is distributed, and a rear air conditioner blower 600 is provided on a route in the middle of the medium passage. In the present embodiment, the cooling medium is described as air. The medium, however, is not specifically limited to air, and a gas other than air, or liquid may be used.

The medium passage is connected to inlets 150 and 152 provided in the compartment, and connected to battery cooling blower 400 and an outlet (not shown) of air conditioner in the compartment.

The medium passage is formed of cooling ducts 154, 156, 158, 160, 162, 164, 502 and 504, and switch dampers 102, 104, 106, 108, 110 and 112. The medium passage has a plurality of air distribution routes realized by switching of switch dampers 102, 104, 106, 108, 110 and 112.

Inlets 150 and 152 are connected by cooling duct 154. Further, between inlets 150 and 152 of cooling duct 154, switch damper 102 is provided. By the switching of switch damper 102, a route between inlets 150 and 152 through cooling duct 154 is rendered communicable or shut-off.

One end of cooling duct 154 on the side of inlet 150 is connected to one end of cooling duct 156 and one end of cooling duct 160. The other end of cooling duct 156 is connected to a middle portion of cooling duct 162. Further, to a middle portion of cooling duct 156, one end of cooling duct 158 is connected.

At a branch position between cooling ducts 156 and 158, switch damper 104 is provided. By the switching of switch damper 104, the route between cooling ducts 156 and 158 may be shut off, or cooling duct 158 and a part of cooling duct 156 on the side connected to cooling duct 162 is communicated, while one end and the other end of cooling duct 156 are shut off. The other end of cooling duct 158 is connected to trunk room 800.

At the other end of cooling duct 156, switch damper 106 is provided. By the switching of switch damper 106, cooling ducts 156 and 162 are communicated, cross-sectional area of the passage of cooling duct 162 is reduced, or communication between cooling ducts 156 and 162 is shut-off.

One end of cooling duct 162 is connected to the middle of cooling duct 154. On the side of the one end of cooling duct 162, a filer 900 is provided. Filter 900 removes foreign matter such as dirt and dust from the air passing therethrough. In the middle of cooling duct 162 and between the branching position of cooling duct 156 and filer 900, rear air conditioner blower 600 is provided. The other end of cooling duct 162 is connected to the outlet of air conditioner in the compartment.

In the middle of cooling duct 162 on the side closer to the outlet of air conditioner in the compartment from the branching position of cooling duct 164, switch dampers 110 and 112 are provided. By the switching of dampers 110 and 112, one end and the other end of cooling duct 162 are communicated, one end and the other end of cooling duct 162 are shut off, or by the switching of either one of switch dampers 110 and 112, the cross-sectional area of the passage in the middle of cooling duct 162 is reduced.

Further, in the middle of cooling duct 162 and on the side closer to the air conditioner outlet than the branching position to cooling duct 156, an evaporator 1000 is provided. Evaporator 1000 itself is cooled as the coolant therein evaporates, and when air supplied from rear air conditioner blower 600 contacts, the air temperature lowers. The structure of evaporator 1000 is well-known and, therefore, detailed description thereof will not be given here.

Further, in the middle of cooling duct 162 and between evaporator 1000 and switch dampers 110 and 112, one end of cooling duct 164 is connected. Further, the other end of cooling duct 164 is connected to the middle portion of cooling duct 160.

At the branch position of cooling ducts 164 and 160, switch damper 108 is provided. By the switching of switch damper 108, communication between cooling ducts 160 and 164 is shut off, one end and the other end of cooling duct 160 is shut off and cooling ducts 160 and 164 are communicated, or cooling ducts 160 and 164 are communicated and one end and the other end of cooling duct 160 are communicated.

The other end of cooling duct 160 is connected to battery cooling blower 400. Battery cooling blower 400 is connected through cooling duct 502 to high-voltage battery 500. The air fed from battery cooling blower 400 is supplied to high-voltage battery 500.

High-voltage battery 500 is connected to one end of cooling duct 504. To cooling duct 504, the air, of which temperature has been increased because of heat-exchange at high-voltage battery 500, is discharged. The other end of cooling duct 504 is, by way of example, formed to communicate to the outside of the vehicle, though it is not limiting. It may be connected to the trunk room, or it may be connected to the compartment, or it may be circulated to rear air conditioner unit 100.

Switch dampers 102, 104, 106, 108, 110 and 112 continuously switch damper positions (angles) in response to switching signals from air conditioner ECU 200, though not limiting. By way of example, these may selectively change a predetermined plurality of positions (for example, two positions) in response to the switching signal from air conditioner ECU 200.

Further, an intake air temperature detection sensor 302 is provided for detecting temperature of the air taken to high-voltage battery 500, in the passage in the middle of cooling duct 502. Intake air temperature detection sensor 302 transmits a signal indicating the detected air temperature TC to HV_ECU 300.

Further, in high-voltage battery 500, a battery temperature detection sensor 304 is provided for detecting the temperature of high-voltage battery 500. Battery temperature detection sensor 304 transmits a signal indicating temperature TB of high-voltage battery 500 to HV_ECU 300.

In the present embodiment, high-voltage battery 500 is a battery pack, including a battery module assembly formed by combining a plurality of battery modules which in turn is formed by connecting a plurality of battery cells in series, and a housing accommodating the battery module assembly.

The air supplied to high-voltage battery 500 is circulated in the housing and contacts the battery module assembly therein, so that heat exchange takes place. Therefore, the heat generated at the time of charging/discharging in the battery module assembly is transmitted to the air and the temperature of battery module assembly decreases and the assembly is cooled.

Battery cooling blower 400 includes an electric motor and a cooling fan (both not shown). To battery cooling blower 400, a duty control command signal is transmitted from HV_ECU 300. The electric motor of battery cooling blower 400 is driven based on the received duty control command signal. As the electric motor is driven, the cooling fan rotates, and air is supplied from battery cooling blower 400 to high-voltage battery 500.

Rear air conditioner blower 600 includes an electric motor and a cooling fan (both not shown). To rear air conditioner blower 600, a duty control command signal is transmitted from air conditioner ECU 200. The electric motor of rear air conditioner blower 600 is driven based on the received duty control command signal. As the electric motor is driven, the cooling fan rotates, and air is supplied from rear air conditioner blower 600 to evaporator 1000.

The battery cooling blower 400 corresponds to the "first supply means", and the rear air conditioner blower 600 corresponds to the "second supply means."

Further, a rotation speed detection sensor (not shown) for detecting the rotation speed of the electric motor or the cooling fan is provided on battery cooling blower 400. The rotation speed sensor transmits a signal indicating the rotation speed of the electric motor or the cooling fan to HV_ECU 300.

Further, a rotation speed detection sensor (not shown) for detecting the rotation speed of the electric motor or the cooling fan is provided on rear air conditioner blower 600. The rotation speed detection sensor transmits a signal indicating the rotation speed of the electric motor or the cooling fan to air conditioner ECU 200.

The rotation speed detection sensor may be realized, for example, by a resolver or the like provided on the electric motor, though not limiting. For instance, a hole device or the like may be used to detect the rotation speed of the electric motor or the cooling fan.

Air conditioner ECU 200 controls switch dampers 102, 104, 106, 108, 110 and 112 such that at least one of these is switched, in accordance with the state of operation of rear air conditioner unit 100 or room temperature. Air conditioner ECU 200 is connected to enable bi-directional communication with HV-ECU 300. Therefore, in response to a request for switching dampers from HV_ECU 300, air conditioner ECU 200 controls switch dampers 102, 104, 106, 108, 110 and 112 such that one of these is switched.

HV_ECU 300 controls the state of charge of high-voltage battery 500, controls battery cooling blower 400 in accordance with the state of high-voltage battery 500, and controls the rotating electrical machine and other electrical equipment mounted on the vehicle, in accordance with the state of the vehicle. Though HV_ECU 300 and air conditioner ECU 200 are described as two ECUs capable of bi-directional communication in the present embodiment, one ECU having integrated functions of HV_ECU 300 and air conditioner ECU 200 may be used.

In the present embodiment having the configuration as above, air conditioner ECU 200 selects one distribution route among the plurality of air distribution routes of the medium passage, in accordance with the switch request from HV_ECU 300 or state of operation of rear air conditioner unit 100. Specifically, air conditioner ECU 200 transmits a damper switching signal to at least one of switch dampers 102, 104, 106, 108, 110 and 112, so that air is distributed along any one of the predetermined plurality of air distribution routes in the medium passage, based on the switch request signal from HV_ECU 300, compartment temperature or state of operation of rear air conditioner unit 100.

Figure 2:
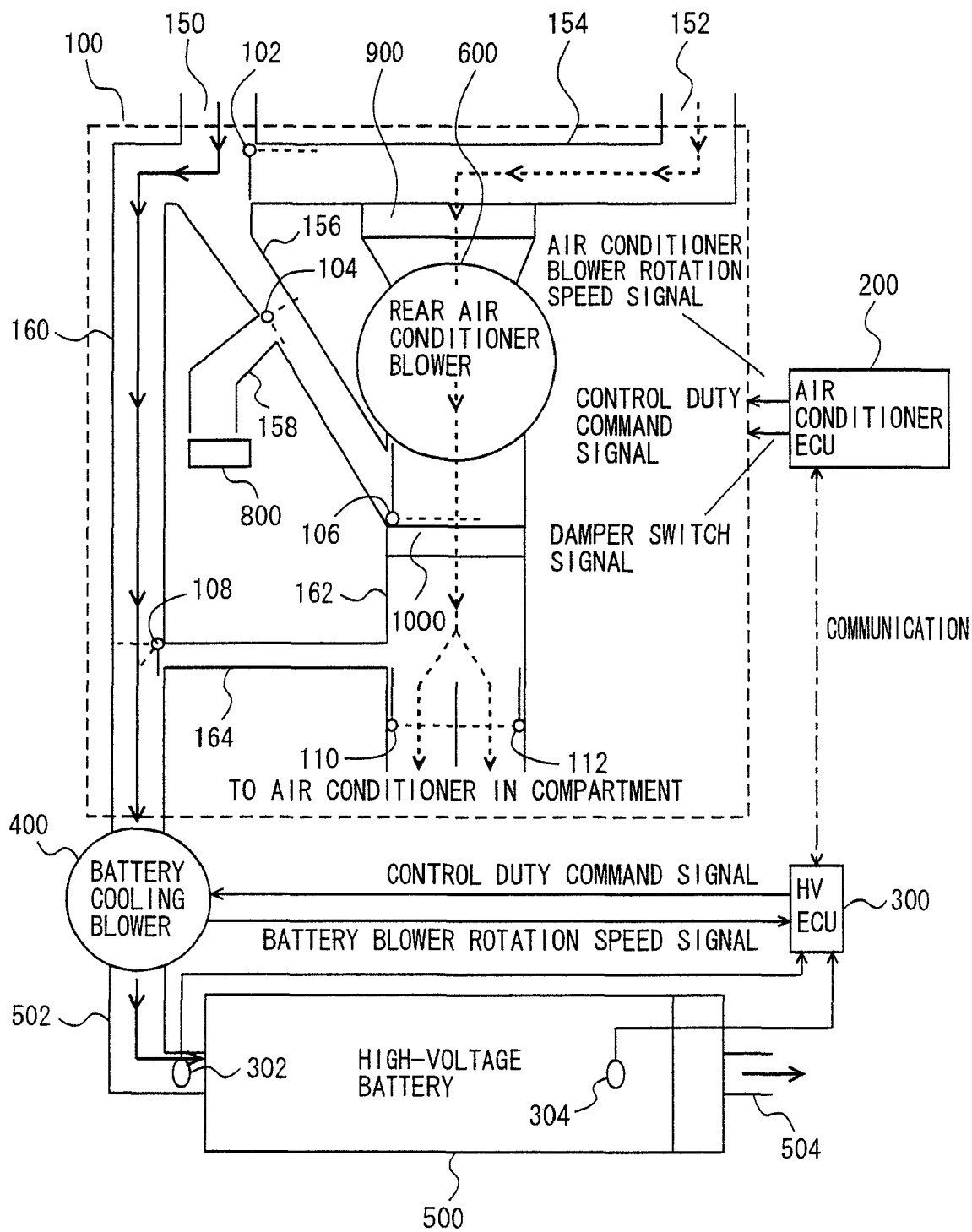
FIG. 2 shows an air flow (route A) in the medium passage.

By way of example, when the distribution route of air used for cooling high-voltage battery 500 and the distribution route of air used for air conditioning are to be separated as shown in FIG. 2, air conditioner ECU 200 switches switch damper 102 such that the space between inlets 150 and 152 at opposite ends of cooling duct 154 are shut off. Further, air conditioner ECU 200 switches switch damper 106 such that communication between cooling duct 156 and cooling duct 162 is shut off. Air conditioner ECU 200 may switch damper 104 such that one end and the other end of cooling duct 156 are shut off. Further, air conditioner ECU 200 switches switch damper 108 such that the route between cooling duct 164 and cooling duct 160 is shut off.

When battery cooling blower 400 operates with the switch dampers 102, 104, 106, 108, 110 and 112 switched in the above-described manner, the air in the compartment is introduced through inlet 150, as represented by a solid arrow in FIG. 2. The air introduced to inlet 150 flows though cooling duct 160, and taken into battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. At this time, the heat of battery module assembly is transmitted to the air. In the following description, the route represented by solid arrow in FIG. 2 will be referred to as "Route A."

When rear air conditioner unit 100 operates and rear air conditioner blower 600 operates, the air in the compartment is introduced through inlet 152, as represented by a dotted arrow in FIG. 2. The air introduced through inlet 152 flows through cooling duct 154, passes through filer 900, and taken into rear air conditioner blower 600. By the operation of rear air conditioner blower 600, the air fed with pressure from the cooling fan is supplied to evaporator 1000. The air supplied to evaporator 1000 takes part in the heat exchange with evaporator 1000, and thereafter, the air is discharged through the air conditioner outlet in the compartment. At this time, the heat of air is transmitted to evaporator 1000. Therefore, the air discharged through the outlet has lower temperature than the air taken through inlet 152.

Figure 3:
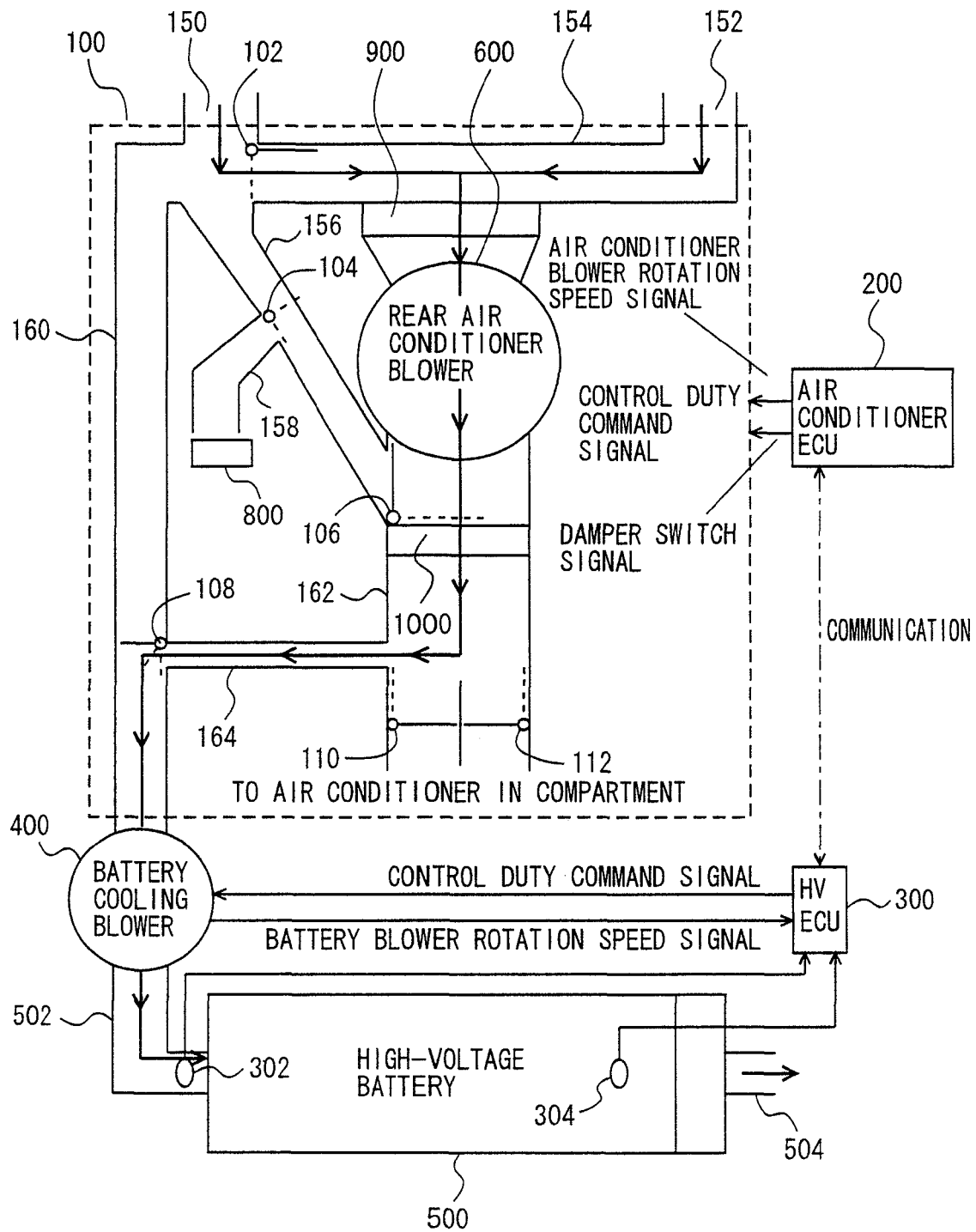
FIG. 3 shows an air flow (route B) in the medium passage.

On the other hand, referring to FIG. 3, when the air of which temperature is made lower by rear air conditioner unit 100 is used for cooling high-voltage battery 500, air conditioner ECU 200 switches switch damper 102 so that inlets 150 and 152 at the opposite ends of cooling duct 154 are communicated. Further, air conditioner ECU 200 switches switch damper 106 such that communication between cooling ducts 156 and 162 is shut off.

Further, air conditioner ECU 200 switches switch damper 108 such that one end and the other end of cooling duct 160 are shut off. Further, air conditioner ECU 200 switches switch dampers 110 and 112 such that in cooling duct 162, communication between the side of rear air conditioner blower 600 and the side of air conditioner outlet in the compartment is shut off.

When battery cooling blower 400 and air conditioner blower 600 operate with the switch dampers 102, 104, 106, 108, 110 and 112 switched in the above-described manner, the air in the compartment is introduced to inlets 150 and 152, as shown by the solid arrow in FIG. 3.

The air introduced to inlets 150 and 152 flows through cooling duct 154, passes through filter 900, and taken into rear air conditioner blower 600. By the operation of rear air conditioner blower 600, the air fed with pressure from the cooling fan is supplied to evaporator 1000.

The air supplied to evaporator 1000 takes part in the heat exchange with evaporator 1000, and thereafter, the air flows through cooling duct 164. At this time, the heat of air is transmitted to evaporator 1000. Therefore, the air flowing through cooling duct 164 has a temperature lower than the air taken through inlets 150 and 152.

The air that flows through cooling duct 164 is further introduced to cooling duct 160, and taken by battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. At this time, the heat of battery module assembly is transmitted to the air. In the following description, the route represented by solid arrow in FIG. 3 will be referred to as "Route B."

Figure 4:
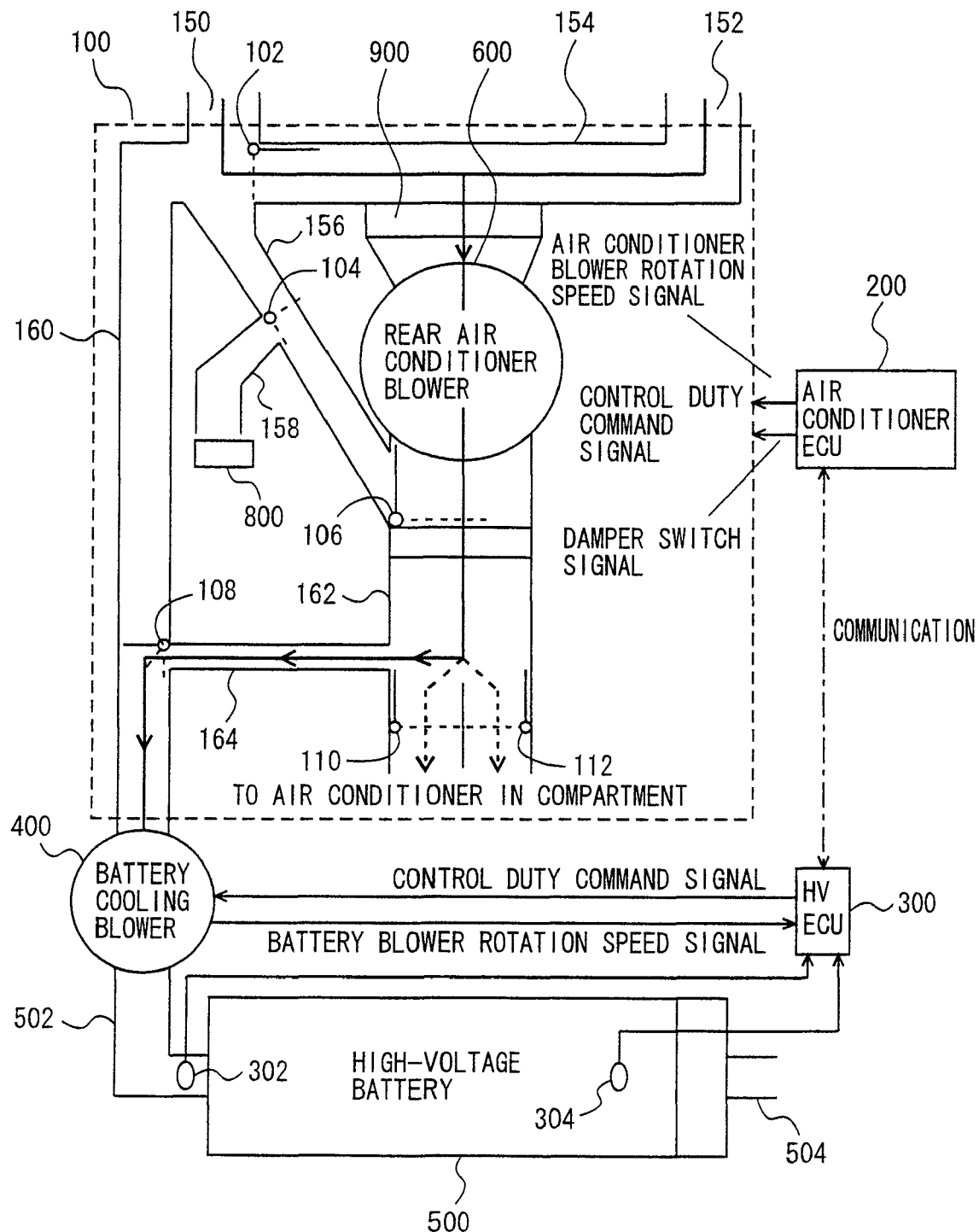
FIG. 4 shows an air flow (route C) in the medium passage.

When the air of which temperature is lowered by rear air conditioner unit 100 is used for air conditioning and for cooling high-voltage battery 500 as shown in FIG. 4, the states of switching of switch dampers 102, 104, 106, 108, 110 and 112 are similar to those of FIG. 3 except that switch dampers 110 and 112 are switched such that the side of rear air conditioner blower 600 and the side of air conditioner outlet in the compartment are communicated.

With the switch dampers 102, 104, 106, 108, 110 and 112 switched in the above-described manner, when battery cooling blower 400 and rear air conditioner blower 600 operate, the air in the compartment is introduced to inlets 150 and 152, as shown by the solid arrow in FIG. 4.

The air introduced to inlets 150 and 152 flows through cooling duct 154, passes through filter 900, and taken into rear air conditioner blower 600. By the operation of rear air conditioner blower 600, the air fed with pressure from the cooling fan is supplied to evaporator 1000.

The air supplied to evaporator 1000 takes part in the heat exchange with evaporator 1000, and thereafter, the air flows through cooling duct 164. At this time, the heat of air is transmitted to evaporator 1000. Therefore, the air flowing through cooling duct 164 has a temperature lower than the air taken through inlets 150 and 152.

The air that flows through cooling duct 164 is further introduced to cooling duct 160, and taken by battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. At this time, the heat of battery module assembly is transmitted to the air. In the following description, the route represented by solid arrow in FIG. 4 will be referred to as "Route C."

When rear air conditioner unit 100 operates, part of the air after heat exchange with evaporator 1000 is discharged from the air conditioner outlet in the compartment, as shown by the dotted arrow in FIG. 4. At this time, the heat of the air is transmitted to evaporator 1000 and, therefore, the air discharged from the outlet has lower temperature than the air taken through inlets 150 and 152.

Figure 5:
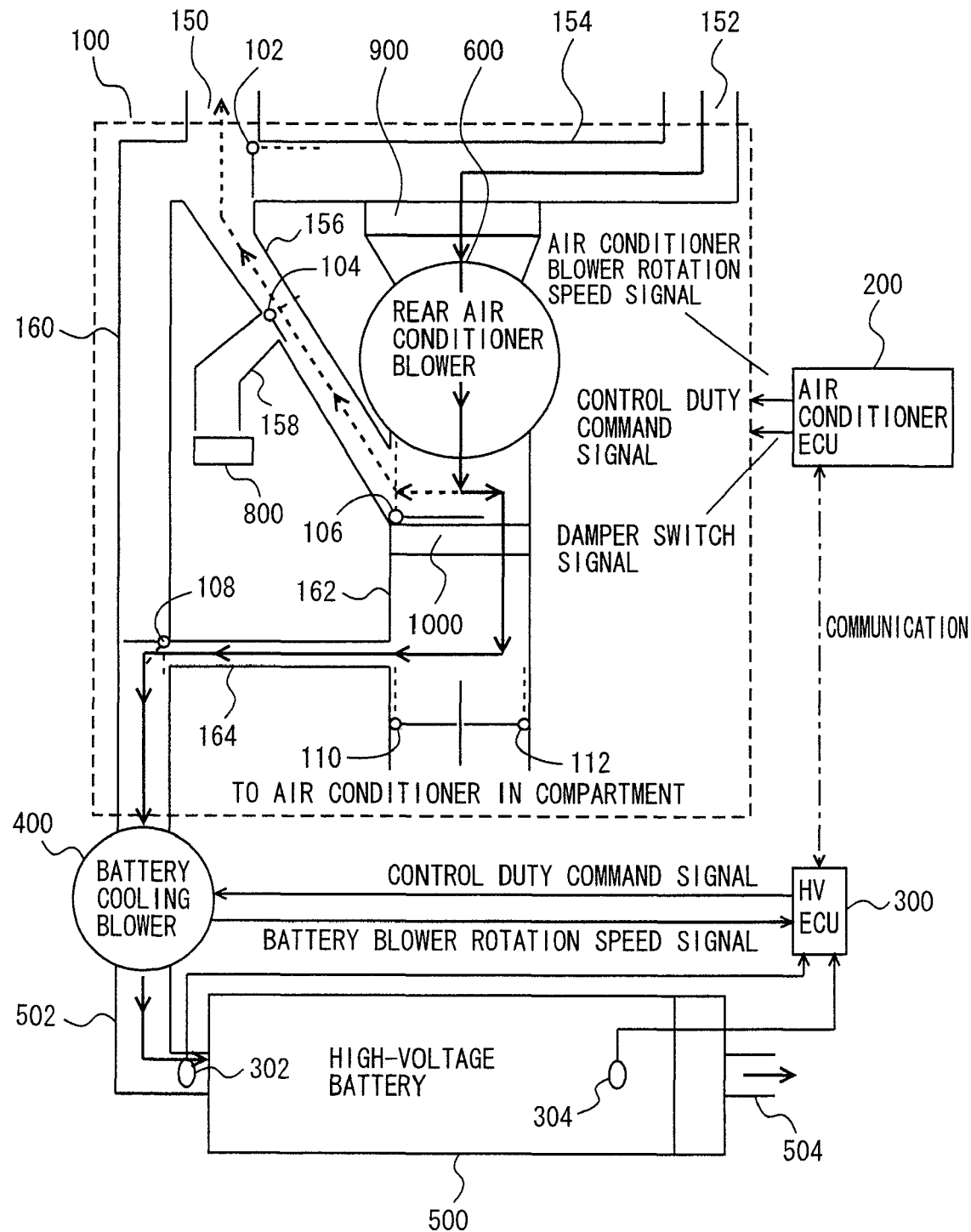
FIG. 5 shows an air flow (route D) in the medium passage.

When rear air conditioner unit 100 performs only blowing of air to the compartment and the high-voltage battery 500 is cooled by using air cooled by evaporator 1000 as shown in FIG. 5, air conditioner ECU 200 switches switch damper 102 such that the route between inlets 150 and 152 at the opposite ends of cooling duct 154 is shut off. Further, air conditioner ECU 200 switches switch damper 106 in cooling duct 162 such that cooling ducts 156 and 162 are communicated and the cross-sectional area of passage of cooling duct 162 is reduced.

Further, air conditioner ECU 200 switches switch damper 108 such that one end and the other end of cooling duct 160 are shut off. Further, air conditioner ECU 200 switches switch dampers 110 and 112 such that in cooling duct 162, communication between the side of rear air conditioner blower 600 and the side of air conditioner outlet in the compartment is shut off.

With the switch dampers 102, 104, 106, 108, 110 and 112 switched in the above-described manner, when battery cooling blower 400 and rear air conditioner blower 600 operate, the air in the compartment is introduced through inlet 152 as represented by the solid arrow in FIG. 5.

The air introduced through inlet 152 flows through cooling duct 154, passes through filter 900, and taken to rear air conditioner blower 600. By the operation of rear air conditioner blower 600, part of the air fed with pressure from the cooling fan is supplied to evaporator 1000.

The air supplied to evaporator 1000 takes part in the heat exchange with evaporator 1000, and thereafter, the air flows through cooling duct 164. At this time, the heat of air is transmitted to evaporator 1000. Therefore, the air flowing through cooling duct 164 has a temperature lower than the air taken through inlet 152.

The air that flows through cooling duct 164 is further introduced to cooling duct 160, and taken by battery cooling blower 400. By the operation of battery cooling blower 400, the air fed with pressure from the cooling fan is supplied to high-voltage battery 500. The air supplied to high-voltage battery 500 takes part in the heat exchange with the battery module assembly in high-voltage battery 500, and thereafter, the air is discharged to cooling duct 504. At this time, the heat of battery module assembly is transmitted to the air. In the following description, the route represented by solid arrow in FIG. 5 will be referred to as "Route D."

Further, when rear air conditioner unit 100 operates, further, part of the air supplied from rear air conditioner blower 600 flows through cooling duct 156 and discharged to the compartment through inlet 150, without touching evaporator 1000, as shown by a dotted arrow in FIG. 5.

In the cooling apparatus having the above-described structure, the present invention is characterized in that HV_ECU 300 estimates the degree of cooling of high-voltage battery 500 by the air supplied from battery cooling blower 400, based on information related to the degree of pressure loss corresponding to the selected route among the plurality of distribution routes set in the medium passage. The present invention is further characterized in that HV_ECU 300 estimates the degree of cooling of high-voltage battery 500 by the air supplied from battery cooling blower 400, based on the state of air supply from rear air conditioner blower 600, in addition to the route information.

HV_ECU 300 controls state of operation of at least one of battery cooling blower 400, rear air conditioner blower 600 and high-voltage battery 500, in accordance with the estimated degree of cooling.

Figure 6:
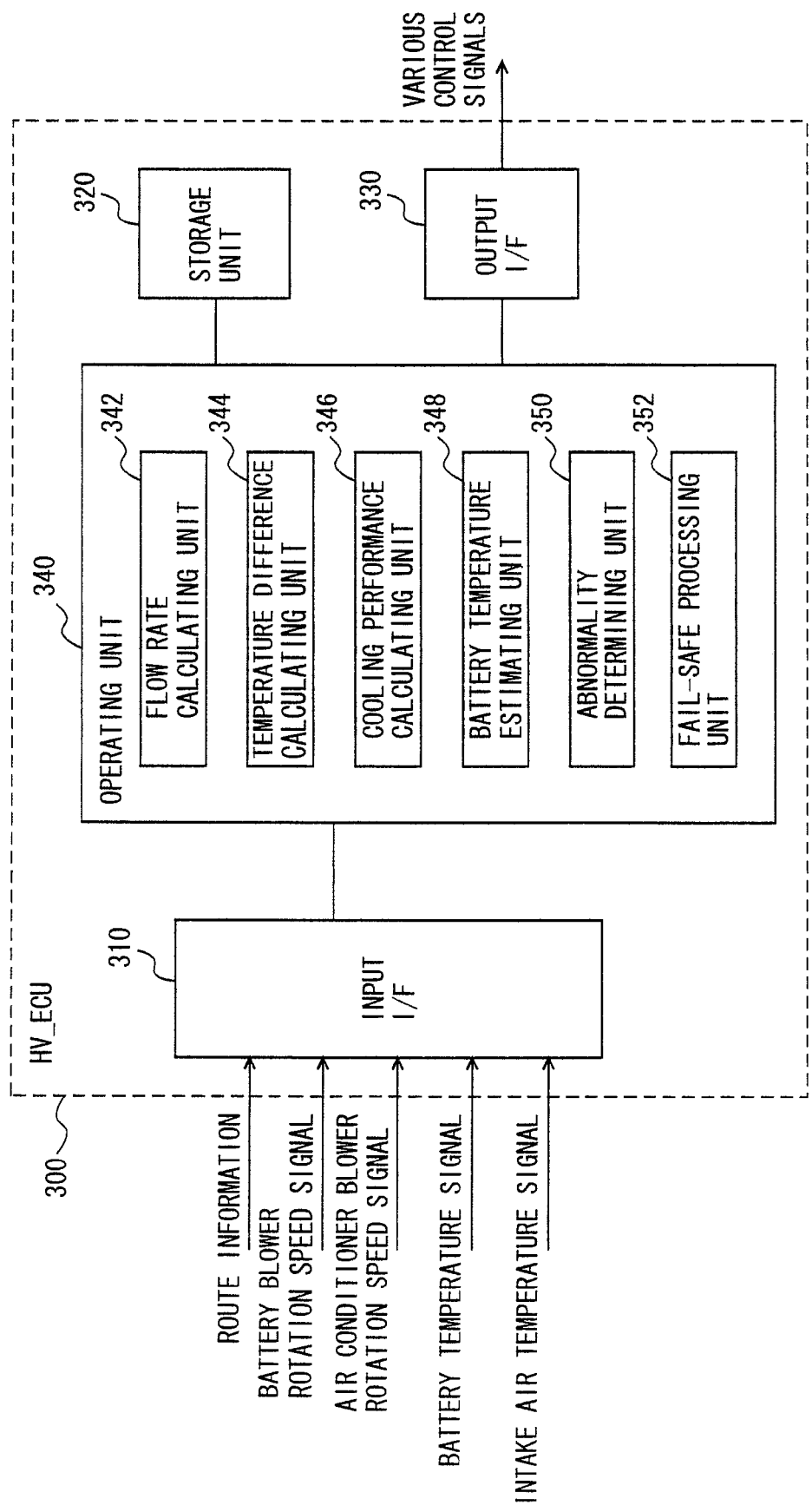
FIG. 6 is a functional block diagram of an HV_ECU included in the electrical equipment cooling apparatus in accordance with the first embodiment.

FIG. 6 is a functional block diagram of HV_ECU 300 included in the cooling apparatus for electrical equipment in accordance with the present embodiment.

HV_ECU 300 includes an input interface (hereinafter denoted as input I/F) 310, an operating unit 340, a storage unit 320, and an output interface (hereinafter denoted as output I/F) 330.

Input I/F 310 receives the route information from air conditioner ECU 200, a battery blower rotation speed signal from battery cooling blower 400, an air conditioner blower rotation speed signal from rear air conditioner blower 600, a battery temperature signal from battery temperature detection sensor 304, and an intake air temperature signal from intake air temperature detection sensor 302, and transmits these signals to operating unit 340.

Operating unit 340 includes a flow rate calculating unit 342, a temperature difference calculating unit 344, a cooling performance calculating unit 346, a battery temperature estimating unit 348, an abnormality determining unit 350, and a fail-safe processing unit 352.

Flow rate calculating unit 342 calculates cooling air flow rate Va fed from battery cooling blower 400 using a table shown in FIG. 7, stored in advance in storage unit 320, from the route information and the duty command value for battery cooling blower 400. The table shown in FIG. 7 represents cooling air flow rate Va corresponding to the states of operations of battery cooling blower 400 and the routes, adapted and set, for example, through experiments. In place of duty command values for battery cooling blower 400, a battery blower rotation speed from battery cooling blower 400 may be used.

Pieces of air flow resistance information (0) to (4) shown in the table of FIG. 7 represent information specifying the cooling air flow rate Va in accordance with the pressure loss in the air distribution route, based on the state of switching of switch dampers 102, 104, 106, 108, 110 and 112 (that is, damper position (angle) or the like of each switch damper) and on the state of operation of rear air conditioner blower 600 (for example, duty command value or rotation speed of rear air conditioner blower 600).

By way of example, assume that the air flow resistance information (2) is set to correspond to the state of switching of route A and to a duty command value within a predetermined range of rear air conditioner blower 600.

When the states of switching of switch dampers 102, 104, 106, 108, 110 and 112 correspond to the state of route A and the duty command value of rear air conditioner blower 600 is within a predetermined range, air conditioner ECU 200 transmits a signal representing air flow resistance information (2) as the route information to HV_ECU 300.

Receiving the route information representing air flow resistance information (2), flow rate calculating unit 342 calculates the cooling air flow rate Va from the table of FIG. 7, based on the duty command value of the battery cooling blower 400. By way of example, assume that the duty command value at this time is 30%. Then, flow rate calculating unit 342 calculates the cooling air flow rate Va of 40 $m^3/h$, from the table of FIG. 7.

Operation of flow rate calculating unit 342 is not limited to calculation of cooling air flow rate Va using the table shown in FIG. 7. By way of example, the flow rate calculating unit may calculate the cooling air flow rate Va using 11 different pieces of air flow resistance information (0) to (10) corresponding to the routes and the state of operation of rear air conditioner blower 600 as shown in FIG. 8. Alternatively, a map or an equation may be used, in place of the table shown in FIG. 7 or FIG. 8. Further, flow rate calculating unit 342 may temporarily store the calculated cooling air flow rate Va in storage unit 320.

Further, flow rate calculating unit 342 may calculate the cooling air flow rate Va for the duty command value not shown in the table of FIG. 7 or FIG. 8 by, for example, linear interpolation.

Temperature difference calculating unit 344 calculates a difference between battery temperature TB of high-voltage battery 500 and intake air temperature TC, based on the battery temperature signal and the intake air temperature signal. Temperature difference calculating unit 344 may temporarily store the calculated difference between battery temperature TB and intake air temperature TC in storage unit 320.

Cooling performance calculating unit 346 calculates cooling performance Wc based on the calculated difference between battery temperature TB and intake air temperature TC and cooling air flow rate Va. In the present embodiment, the "cooling performance" refers to the degree of cooling of high-voltage battery 500 by the air supplied from battery cooling blower 400, and specifically, it represents quantity of heat that can be radiated per unit time.

By way of example, cooling performance calculating unit 346 calculates the cooling performance Wc from the difference between battery temperature TB and intake air temperature TC and from cooling air flow rate Va, using the table shown in FIG. 9. The table shown in FIG. 9 represents cooling performance Wc in correspondence with the difference between battery temperature TB and intake air temperature TC and cooling air flow rate Va, which is adapted, for example, through experiments. In place of the table shown in FIG. 9, a map or an equation may be used.

For instance, cooling performance calculating unit 346 specifies cooling performance Wc of 90 W from the table of FIG. 9, when the calculated difference between battery temperature TB and intake air temperature TC is 5° C. and the cooling air flow rate Va is 40 $m^3/h$. Cooling performance calculating unit 346 may temporarily store the calculated cooling performance Wc in storage unit 320. Further, as regards the cooling air flow rate Va and the difference between battery temperature TB and intake air temperature TC, cooling performance calculating unit 346 may calculate cooling performance Wc corresponding to a temperature difference and flow rate not shown in the table of FIG. 9 by, for example, linear interpolation.

Cooling performance calculating unit 346 may calculate the cooling performance Wc based on the cooling air flow rate Va and the difference between battery temperature TB and intake air temperature TC that are temporarily stored in storage unit 320.

Battery temperature estimating unit 348 estimates battery temperature TBS from the calculated cooling performance Wc and the quantity of heat (current value×current value×internal resistance value) generated in the battery module assembly of high-voltage battery 500 calculated from the internal resistance and current acquired from an ammerter, not shown. Specifically, battery temperature TBS is estimated by calculating the degree of increase or decrease of battery temperature based on the difference between cooling performance Wc and the quantity of generated heat. Battery temperature estimating unit 348 may temporarily store the estimated battery temperature TBS in storage unit 320.

Abnormality determining unit 350 calculates deviation between the estimated battery temperature TBS and the battery temperature TB received from battery temperature detection sensor 304. Abnormality determining unit 350 determines that it is an abnormal condition, caused by excessive charging of high-voltage battery, deteriorated performance of battery cooling blower 400 or the like, if the absolute value of calculated deviation is larger than a predetermined value, or the battery temperature TB is higher by a predetermined value than the estimated battery temperature TBS. Abnormality determining unit 350 may turn on an abnormality determination flag, when it is determined to be an abnormal condition.

Fail-safe processing unit 352 executes a fail-safe process when determination of abnormal condition is made. Fail-safe processing unit 352 executes a fail-safe process by controlling at least one of high-voltage battery 500, rear air conditioner blower 600 and battery cooling blower 400.

Possible fail-safe process may include suspension of power supply by high-voltage battery 500 to the rotating electric machine by shutting off a relay circuit, increase of air supply by rear air conditioner blower 600, or increase of supply by battery cooling blower 400. These are not limiting and any approach that can at least prevent temperature increase of high-voltage battery 500 may be taken.

In the present embodiment, flow rate calculating unit 342, temperature difference calculating unit 344, cooling performance calculating unit 346, battery temperature estimating unit 348, abnormality determining unit 350 and fail-safe processing unit 352 are all described as software functions that are realized by a CPU (Central Processing Unit) as the operating unit 340 executing a program stored in storage unit 320. These may be implemented by hardware. Such a program is recorded on a recording medium and installed in the vehicle.

Storage unit 320 stores various pieces of information, programs, threshold values, maps and the like and data is read or stored by operating unit 340 as needed.

Figure 10:
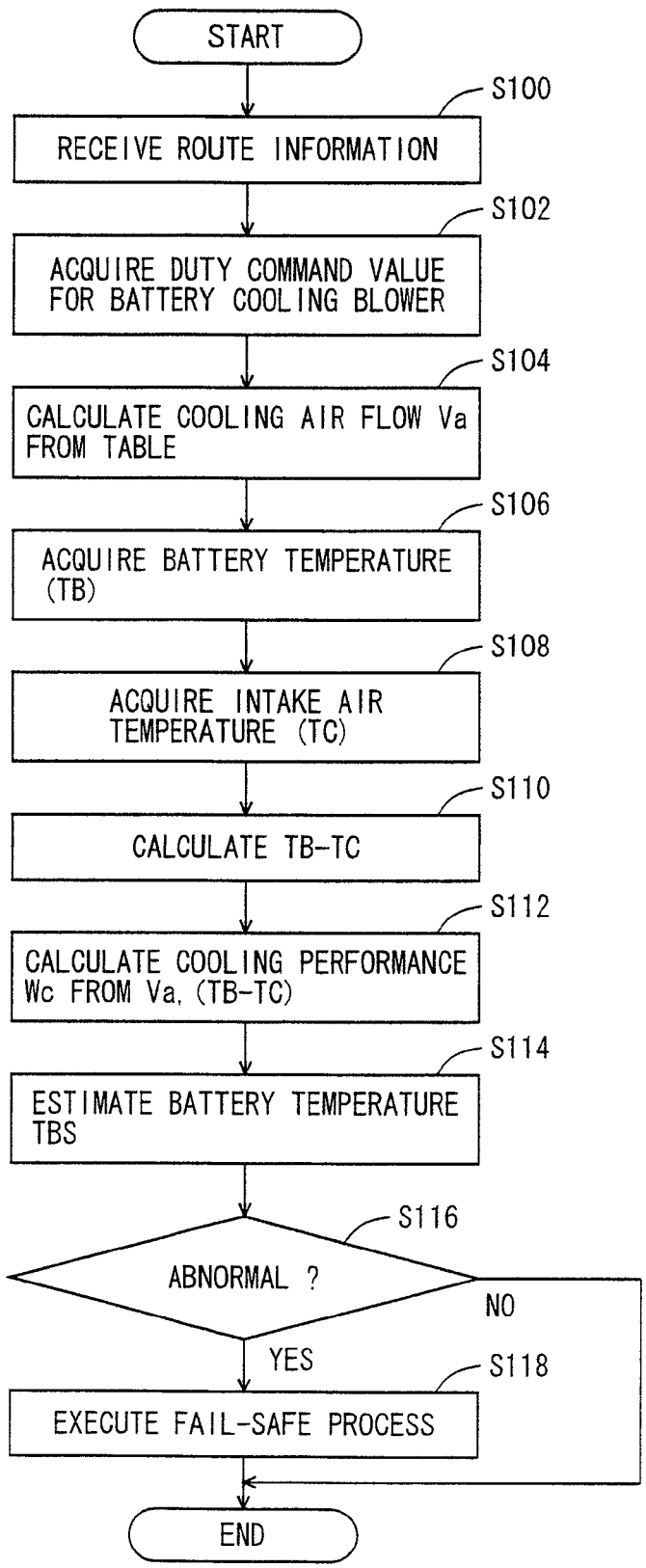
FIG. 10 is a flowchart showing a control structure of a program executed by the HV_ECU included in the electrical equipment cooling apparatus in accordance with the first embodiment.

In the following, the control structure of the program executed by HV_ECU 300 included in the cooling apparatus for electrical equipment in accordance with the present embodiment will be described with reference to FIG. 10.

At step (hereinafter "step" will be simply denoted by S) 100, HV_ECU 300 receives route information including the air flow resistance information, from air conditioner ECU 200. At S102, HV_ECU 300 acquires a duty command value of battery blower 400.

At S104, HV_ECU 300 calculates cooling air flow rate Va from the received route information, the acquired duty command value and the table shown in FIG. 7. At S106, HV_ECU 300 acquires battery temperature TB from battery temperature detection sensor 304. At S108, HV_ECU 300 acquires intake air temperature TC from intake air temperature detection sensor 302.

At S110, HV_ECU 300 calculates difference between battery temperature TB and intake air temperature TC. At S112, HV-ECU 300 calculates cooling performance Wc from cooling air flow rate Va, the difference between battery temperature TB and intake air temperature TC, and the table shown in FIG. 9.

At S114, HV_ECU 300 estimates battery temperature TBS based on the calculated cooling performance Wc and the quantity of heat generated in high-voltage battery 500. At S116, HV_ECU 300 determines whether the battery cooling blower 400, rear air conditioner blower 600 or high-voltage battery 500 is in an abnormal condition.

Specifically, if the absolute value of deviation between the estimated battery temperature and the battery temperature TB acquired from battery temperature sensor 304 is larger than a predetermined value, HV_ECU 300 determines the condition to be abnormal, for example, it determines that high-voltage battery 500 is in an excessively charged state, or the cooling performance of battery cooling blower 400 and rear air conditioner blower 500 is deteriorated. If high-voltage battery 500, battery cooling blower 400 or rear air conditioner blower 600 is abnormal (YES at S116), the process proceeds to S118. If not (NO at S116), the process ends. At S118, HV_ECU 300 executes the fail-safe process.

The operation of cooling apparatus for electrical equipment in accordance with the present embodiment, based on the structure and flowchart as above, will be described in the following.

In accordance with the state of operation of rear air conditioner unit 100, any of the switch dampers 102, 104, 106, 108, 110 and 112 is switched. At this time, HV_ECU 300 receives route information representing any of pieces of air flow resistance information (0) to (4) from air conditioner ECU 200 (S100). HV_ECU 300 acquires a duty command value for battery cooling blower 400 (S102).

HV_ECU 300 calculates cooling air flow rate Va from the received route information, acquired duty command value and the table shown in FIG. 7 (S104). HV-ECU 300 acquires battery temperature TB from battery temperature detection sensor 304 (S106), and acquires intake air temperature TC from intake air temperature detection sensor 302 (S108).

HV-ECU 300 calculates battery temperature TB−intake air temperature TC (S110), and from the calculated battery temperature TB−intake air temperature TC and the cooling air flow rate Va, calculates the cooling performance Wc (S112).

Based on the calculated cooling performance Wc, HV_ECU 300 estimates battery temperature TBS (S114), and if the absolute value of deviation between the estimated battery temperature TBS and the battery temperature TB acquired from battery temperature detection sensor 304 is equal to or higher than a predetermined value (YES at S116), it executes the fail-safe process (S118).

When the fail-safe process is executed, because of the increase of air supply by battery cooling blower 400 or rear air conditioner blower 600, or because of suspension of power supply of high-voltage battery 500, increase of battery temperature in high-voltage battery 500 is prevented.

If the absolute value of deviation is smaller than the predetermined value, it is determined not to be an abnormal condition (NO at S116), and the fail-safe process is not executed.

As described above, in the cooling apparatus for electrical equipment in accordance with the present embodiment, when there are a plurality of distribution routes formed in the medium passage, each route has different degree of pressure loss and, therefore, based on the information related to the degree of pressure loss corresponding to the selected route, the cooling performance is estimated, whereby the cooling performance for the high-voltage battery by the battery cooling blower in the selected route can be grasped correctly.

In addition, if the battery cooling blower and the rear air conditioner blower are provided on the distribution route, dependent on the state of supply of the cooling medium of the rear air conditioner blower, the flow rate of air supplied to the high-voltage battery differs even when the battery cooling blower operates in the same manner. Therefore, based on the state of air supply from rear air conditioner blower, the cooling performance for the high-voltage battery by the air supplied by the battery cooling blower is estimated, whereby the cooling performance for the high-voltage battery by the battery cooling blower can correctly be grasped.

Therefore, by controlling the amount of supply in accordance with the estimated cooling performance, accuracy of cooling control for the high-voltage battery can be improved. By estimating the temperature of high-voltage battery based on the estimated cooling performance, and determining whether at least one of battery cooling blower, rear air conditioner blower and high-voltage battery is abnormal based on the difference between the estimated temperature and the actual temperature of the high-voltage battery, accuracy of determining abnormality can be improved. Therefore, it is possible to provide cooling apparatus and cooling method for electrical equipment that can correctly grasp the cooling performance and thereby improve accuracy of cooling control of the electrical equipment and accuracy of determining any abnormality.

In the present embodiment, a structure has been described, which has a plurality of distribution routes and at least on one of the plurality of distribution routes, the rear air conditioner blower is provided. The structure is not limiting. Specifically, the present invention may be applied to a structure having a plurality of distribution routes, and the rear air conditioner blower is not provided on any of the distribution routes, or the present invention may be applied to a structure having a single distribution route and a plurality of cooling blowers are provided on the distribution route. Even in that case, similar effects as attained by the cooling apparatus for electrical equipment in accordance with the present embodiment can be attained.

Second Embodiment

In the following, a cooling apparatus for electrical equipment in accordance with a second embodiment of the present invention will be described. As compared with the structure of the cooling apparatus for electrical equipment in accordance with the first embodiment described above, the cooling apparatus for electrical equipment in accordance with the present embodiment differs in the tables used for calculating cooling air flow rate Va and cooling performance Wc, and in the structure of flow rate calculating unit 342. Except for these points, it has the same structure as that of the cooling apparatus for electrical equipment in accordance with the first embodiment described above. Therefore, detailed description thereof will not be repeated here.

The present embodiment is characterized in that HV_ECU 300 receives the state of air supply of rear air conditioner blower 600 and the state of switching of switch dampers 102, 104, 106, 108, 110 and 112 as the route information from air conditioner ECU 200, and based on the received route information, it estimates the degree of cooling of high-voltage battery 500 by the air supplied by battery cooling blower 400.

The functional block diagram of HV_ECU 300 included in the cooling apparatus for electrical equipment in accordance with the present embodiment differs from the functional block diagram of HV_ECU 300 included in the cooling apparatus for electrical equipment in accordance with the first embodiment described with reference to FIG. 6, in the structure of flow rate calculating unit 342. Except for this point, it is the same as the structure of HV_ECU 300 included in the cooling apparatus for electrical equipment in accordance with the first embodiment described above. Therefore, detailed description thereof will not be repeated.

Flow rate calculating unit 342 calculates the cooling air flow rate Va fed from battery cooling blower 400, based on the state of air supply from rear air conditioner blower 600 and the state of switching of switch dampers 102, 104, 106, 108, 110 and 112.

Specifically, flow rate calculating unit 342 specifies which of the routes A to D is selected as the current air distribution route, based on the state of switching of switch dampers 102, 104, 106, 108, 110 and 112. Further, storage unit 320 stores tables that represents cooling air flow rate Va in correspondence with the duty command value of battery cooling blower 400 and the duty command value of rear air conditioner blower 600 in respective routes A to D, as shown in FIGS. 11 to 14.

In place of the duty command value of battery cooling blower 400 and the duty command value of rear air conditioner blower 600, the rotation speed of battery cooling blower 400 and the rotation speed of rear air conditioner blower 600 may be used. Specifically, storage unit 320 may store tables representing the cooling air flow rate Va in correspondence with the rotation speed of battery cooling blower 400 and the rotation speed of rear air conditioner blower 600 in respective routes A to D.

The table of FIG. 11 shows the cooling air flow rate Va in correspondence with the duty command value of battery cooling blower 400 and the duty command value of rear air conditioner blower 600, for route A.

The table of FIG. 12 shows the cooling air flow rate Va in correspondence with the duty command value of battery cooling blower 400 and the duty command value of rear air conditioner blower 600, for route B.

The table of FIG. 13 shows the cooling air flow rate Va in correspondence with the duty command value of battery cooling blower 400 and the duty command value of rear air conditioner blower 600, for route C.

The table of FIG. 14 shows the cooling air flow rate Va in correspondence with the duty command value of battery cooling blower 400 and the duty command value of rear air conditioner blower 600, for route D.

Flow rate calculating unit 342 calculates the cooling air flow rate Va based on the table corresponding to the specified route, the duty command value for battery cooling blower 400 and the duty command value for rear air conditioner blower 600.

Assume, for example, that the duty command value for battery cooling blower 400 is 40%. Further, receiving the route information that the state of switching of switch dampers 102, 104, 106, 108, 110 and 112 corresponds to route A and that the duty command value for rear air conditioner blower 600 is 40% from air conditioner ECU 200, flow rate calculating unit 342 calculates the cooling air flow rate Va to be 50 m$^3$/h, from the table corresponding to route A of FIG. 11.

Operation of flow rate calculating unit 342 is not limited to calculation of cooling air flow rate Va using the tables shown in FIG. 11 to 14 corresponding to routes A to D. Specifically, storage unit 320 may store tables for calculating the cooling air flow rate corresponding to a plurality of different routes, not limited to four. Flow rate calculating unit 342 may specify the table corresponding to the route in accordance with the state of switching of switch dampers 102, 104, 106, 108, 110 and 112, and based on the specified table and the duty command values for the battery cooling blower 400 and rear air conditioner blower 600, it may calculate the cooling air flow rate Va.

The flowchart representing the control structure of the program executed by HV_ECU 300 included in the cooling apparatus for electrical equipment in accordance with the present embodiment has the same structure as the flowchart representing the control structure of the program executed by HV_ECU 300 included in the cooling apparatus for electrical equipment in accordance with the first embodiment described above with reference to FIG. 10. Therefore, detailed description thereof will not be repeated.

The operation of the cooling apparatus for electrical equipment in accordance with the present embodiment based on the structure and flowchart as above will be described in the following.

In accordance with the state of operation of rear air conditioner unit 100, any of the switch dampers 102, 104, 106, 108, 110 and 112 is switched. At this time, HV_ECU 300 receives route information representing the duty command value of rear air conditioner blower 600 and the state of switching of switch dampers 102, 104, 106, 108, 110 and 112 (S100). HV_ECU 300 acquires the duty command value for battery cooling blower 400 (S102).

From the received route information and the acquired duty command value, HV_ECU 300 calculates the cooling air flow rate Va using tables shown in FIGS. 11 to 14 (S104). HV_ECU 300 acquires the battery temperature TB from battery temperature detection sensor 304 (S106), and acquires intake air temperature TC from intake air temperature detection unit 302 (S108).

HV_ECU 300 calculates battery temperature TB−intake air temperature TC (S110), and calculates cooling performance Wc from the calculated battery temperature TB−intake air temperature TC and cooling air flow rate Va (S112).

Based on the calculated cooling performance Wc, HV_ECU 300 estimates battery temperature TBS (S114), and if the absolute value of deviation between the estimated battery temperature TBS and the battery temperature TB acquired from battery temperature detection sensor 304 is equal to or higher than the predetermined value (YES at S116), it executes the fail-safe process (S118).

When the fail-safe process is executed, increase in battery temperature of high-voltage battery 500 is prevented, as the amount of air supply by battery cooling blower 400 or rear air conditioner blower 600 is increased, or the power supply of high-voltage battery 500 is suspended.

If the absolute value of deviation is smaller than the predetermined value (NO at S116), the condition is determined to be normal, and the fail-safe process is not executed.

As described above, the cooling apparatus for electrical equipment in accordance with the present embodiment attains similar effects as attained by the cooling apparatus for electrical equipment in accordance with the first embodiment described above.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A cooling apparatus for cooling electrical equipment, comprising:
   a medium passage having one end connected to an inlet and the other end connected to said electrical equipment, and having a plurality of cooling medium distribution routes between said inlet and said electrical equipment;
   a supply unit to supply the cooling medium through said medium passage to said electrical equipment;
   a selecting unit to select any one of said plurality of routes;
   an estimating unit to estimate degree of cooling of said electrical equipment by the cooling medium supplied by said supply unit, based on information related to a degree of pressure loss corresponding to the route selected by said selecting unit; and
   a control unit to control at least one of said supply unit and said electrical equipment in accordance with said estimated degree of cooling.

2. The cooling apparatus for electrical equipment according to claim 1, further comprising:
   a first temperature detecting unit to detect a first temperature of said electrical equipment; and
   a second temperature detecting unit to detect a second temperature of the cooling medium supplied to said electrical equipment; wherein
   said estimating unit estimates flow rate of the cooling medium supplied to said electrical equipment by said supply unit, and estimates said degree of cooling, based on said estimated flow rate and a difference between said detected first temperature and said detected second temperature.

3. The cooling apparatus for electrical equipment according to claim 2, further comprising:
   a temperature estimating unit to estimate temperature of said electrical equipment based on said estimated degree of cooling; and
   a determining unit to determine whether at least one of said electrical equipment and said supply unit is in an abnormal condition, based on a difference between said detected first temperature and said estimated temperature; wherein
   said control unit controls at least one of said supply unit and said electrical equipment such that the temperature of said electrical equipment is at least not increased, when determination of said abnormal condition is made.

4. The cooling apparatus for electrical equipment according to claim 2, wherein
   said medium passage is provided, at a branching position of said distribution routes, with a switching mechanism for switching said distribution routes;
   said selecting unit selects said distribution route by switching said distribution route using said switching mechanism; and
   said information includes correspondence between state of switching of said switching mechanism and said flow rate.

5. A method of cooling electrical equipment provided with a medium passage having one end connected to an inlet and the other end connected to said electrical equipment, and having a plurality of cooling medium distribution routes between said inlet and said electrical equipment, said method comprising the steps of:
   supplying a cooling medium from a supply source to said electrical equipment through said medium passage;
   selecting any one of said plurality of routes;
   estimating a degree of cooling of said electrical equipment by the cooling medium supplied from said supply source, based on information related to a degree of pressure loss corresponding to said selected route; and
   controlling at least one of said supply source and said electrical equipment in accordance with said estimated degree of cooling.

6. The method of cooling electrical equipment according to claim 5, further comprising the steps of:
   detecting a first temperature of said electrical equipment; and
   detecting a second temperature of the cooling medium supplied to said electrical equipment; wherein
   said step of estimating the degree of cooling estimates flow rate of the cooling medium supplied to said electrical equipment from said supply source, based on said information, and estimates said degree of cooling, based on said estimated flow rate and a difference between said detected first temperature and said detected second temperature.

7. The method of cooling electrical equipment according to claim 6, further comprising the steps of:
   estimating temperature of said electrical equipment based on said estimated degree of cooling; and
   determining whether at least one of said electrical equipment and said supply source is in an abnormal condition, based on a difference between said detected first temperature and said estimated temperature; wherein
   said step of controlling controls at least one of said supply source and said electrical equipment such that the temperature of said electrical equipment is at least not increased, when determination of said abnormal condition is made.

8. The method of cooling electrical equipment according to claim 7, wherein
   said medium passage is provided, at a branching position of said distribution routes, with a switching mechanism for switching said distribution routes;
   said step of selecting selects said distribution route by switching said distribution route using said switching mechanism; and
   said information includes correspondence between state of switching of said switching mechanism and said flow rate.

* * * * *